Figure 1:
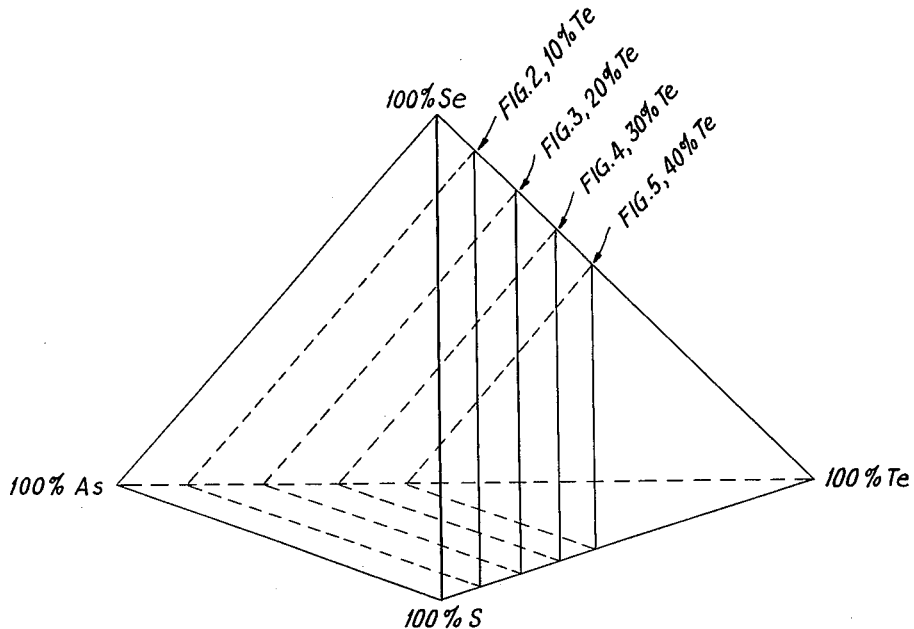

March 22, 1966   J. JERGER, JR   3,241,986
OPTICAL INFRARED-TRANSMITTING GLASS COMPOSITIONS
Filed Feb. 28, 1962                                2 Sheets-Sheet 1

INVENTOR.
JOSEPH JERGER, JR.

BY Roy C. Hopgood

ATTORNEY.

March 22, 1966  J. JERGER, JR  3,241,986
OPTICAL INFRARED-TRANSMITTING GLASS COMPOSITIONS
Filed Feb. 28, 1962  2 Sheets-Sheet 2

INVENTOR.
JOSEPH JERGER, JR.
BY
Roy C. Hopgood
ATTORNEY.

United States Patent Office 3,241,986
Patented Mar. 22, 1966

3,241,986
OPTICAL INFRARED-TRANSMITTING
GLASS COMPOSITIONS
Joseph Jerger, Jr., Hempstead, N.Y., assignor to Servo
Corporation of America, Hicksville, N.Y., a corporation of New York
Filed Feb. 28, 1962, Ser. No. 176,338
11 Claims. (Cl. 106—47)

This invention relates to glasses produced from substantially quaternary mixtures of the elements arsenic, sulfur, selenium and tellurium and, in particular, to glasses having an improved combination of optical properties in the infrared spectrum.

The ever-increasing demand for infrared optical systems of larger aperture and wider angular fields-of-view caused by the advancing technology of infrared devices for military, industrial and space applications has resulted in an intensive search for systems having performance characteristics considerably better than those conventionally in use at present, primarily reflective systems, single-element refractive systems and achromatic doublets.

Single-element refractors suffer from both spherical and chromatic aberartions. Reflective elements exhibit no dispersion, but the problems of self-masking, elimination of stray radiation, and off-axis aberrations often render them impractical. Achromatic doublets overcome many of these difficulties, but are restricted in optimum performance to very narrow fields-of-view. A good camera lens which combines a wide field with good optical imaging and high light gathering power (f/no.) generally comprises a plurality of optical elements which are necessary to provide corrections for the various lens aberrations, and the optical characteristics of the glass for each element must be carefully selected in order to achieve the desired correction. Infrared lens technology is not as highly developed as the technology of the lenses employed in the visible spectrum, because the scarcity of optical materials useful in the infrared band presents a considerable problem, even in the design of an achromatic doublet.

When the desired performance is such as to require 3 or more lens elements, the difficulties are magnified greatly. Three or four element infrared lenses generally do not approach the performance of lenses available for use in the visible spectrum, and infrared lenses with more than four elements are not available because of the lack of suitable optical materials.

Because of the above factors, the need for improved optical materials for use in wide-angle, high resolution infrared refractive systems becomes apparent.

Infrared transmitting glasses are receiving attention also in the newly developed field of fiber optics. It is known that if light shines on the end of a glass rod, much of the light that enters will be caught inside the rod, unable to escape out the sides because of substantially total internal reflections. The light is reflected a number of times from the walls and finally escapes from the far end. The same thing happens when the diameter of the rod is made very small. In fact, there is no substantial change in the behavior until the diameter of the cylinder becomes comparable to the wavelength of light, say 5 microns, and a fiber 50 microns in diameter (about 0.002 inch) behaves optically just like a rod. If many such small diameter glass fibers are gathered together into an orderly bundle or array, they will transmit an image around a corner, so to speak, by breaking it up into separate components and transmitting each of these components independently along a fiber from one end of the bundle to the other, provided the fibers are in the same corresponding arrangement at each end. This is true irrespective of the path of each individual fiber between the ends of the bundle.

A difficulty in extending infrared fiber optics to use in the far infrared region (8 to 14 microns) is the lack of materials which can be drawn into fibers and which have adequate transmission properties. In addition to transmittance, devitrification is also a critical factor in determining whether or not a glass is suitable for the fabrication of optical fibers, for only a few tiny crystals need be present in a fiber to destroy its usefulness completley.

In U.S. Patent No. 2,883,291, which issued on April 21, 1959, ternary mixtures of $As_2Se_3$, $As_2S_3$ and $As_2Te_3$ are disclosed as being selective to infrared radiation provided the mixtures are controlled over a restricted range of compositions. While these mixtures, based on the foregoing compounds, may correspond in effect to quaternary mixtures of arsenic, sulfur, selenium and tellurium and exhibit some valuably useful infrared transmission properties, they lack the wide and versatile range of optical properties necessary in designing the most advanced types of infrared optical systems having the desired aberration correction, optimum transmission efficiency, optimum transmission cut-off, etc. For one thing, it was found that when these glasses were formulated with tellurium relatively on the high side of the composition range, such as those illustrated by compositions "M" and "N" in the figure and in column 2 of the aforementioned patent, these glasses tended upon reworking to devitrify sufficiently to adversely affect the desired transmission properties. By "reworking" is meant taking a previously produced composition and subjecting it to additional processing which requires heating the glass near, to or above its softening point in order to form it. Such reworking may include sagging, bending, pressing, molding, slumping and the like softening and forming operations. So long as the glasses of the aforementioned patent were chilled cast or produced in sizes which cooled sufficiently rapidly to prevent devitrification, they exhibited adequate properties.

However, the problem becomes more severe as the size of the glass element to be formed increases, since a larger piece must necessarily be cooled more slowly than a small one in order to prevent excessive residual strains in the finished piece. Since slow cooling is conducive to devitrification, the reworking properties of the glass must necessarily be such that devitrification is greatly inhibited.

One evaluation employed in determining the usefulness of an infrared transmitting glass for a specific application is transmission cut-off. "Transmission cut-off" as used herein is defined as the wavelength at which the transmission through a 2 mm. thickness of the glass has decreased to 10% and past which the transmission does not again rise above 10%. In making this evaluation, transmitting properties are obtained over the spectral band ranging from 2 to as high as 16 microns. The ability of a glass to sustain high transmission properties over a broad band, for example, a transmission of at least 60% of the incident radiation over a wavelength of 2 to about 13 microns adds to its versatility for use in lens design. Glass compositions capable of being formulated to exhibit indices of refraction ranging from 2 to 2.5 to as high as 3.5 also adds to versatility of lens design.

Insofar as the subject matter disclosed herein is concerned, infrared radiation is divided into two wavelength categories: (1) near infrared which includes wavelengths ranging from the end of the visible spectrum, i.e. about 0.7 micron, up to about 2 microns, and (2) far infrared which ranges from about 2 microns up to about 25 microns.

In devices such as infrared spectrometers, gas analyzers, radiation pyrometers, thermal reconnaisance systems, etc., it is important that the optical glass employed be particularly selective to infrared radiation. It is desirable that the infrared device operate selectively and flexibly over as wide a wavelength range as possible, e.g. 2 to 16 microns, and particularly in the ranges of about 2 to 6 and 8 to 13 microns for applications involving a transmission of infrared energy from a source of radiation through the atmosphere to an infrared detector.

It is accordingly an object of this invention to provide optical infrared transmitting glasses characterized by a broader combination of optical properties heretofore not available in previously developed infrared glasses.

Another object is to provide a new field of glasses produced from quaternary mixtures of the elements arsenic, sulfur, selenium and tellurium.

These and other objects and various further features of novelty and invention will be pointed out or will occur to those skilled in the art from a reading of the following specification taken in conjunction with the accompanying drawing, wherein:

FIG. 1 depicts in three dimensions a tetrahedron based on the elements As, Se, S and Te exaggerated for purposes of clarity showing slices taken parallel to the plane of the As-Se-S equilateral triangle at constant tellurium contents of 10%, 20%, 30% and 40%, respectively; while FIGS. 2 to 5 are representative of glass compositions falling in the composition field determined by the slices at said constant tellurium contents.

A large family of glasses has now been discovered which enables the optical designer to design refractive systems for the infrared spectrum having greatly improved performance characteristics. These glass compositions are not only important to infrared technology because they transmit infrared energy, but also because they combine improved transmission properties along with other desirable optical properties such as a wider range of refractive index and dispersion characteristics. Thus, the new compositions enable the designer to choose materials to fit his system rather than being forced to design his system around the few materials previously available.

The glass compositions differ from those disclosed in the above-identified U.S. Patent 2,883,291, in that they provide a greater number of improved, useful glasses covering a wider range of optical characteristics because of the wider variety of formulations from which one can draw.

I have found that I can achieve the foregoing by utilizing a quaternary mixture of the elements As, Se, S and Te in glass-forming proportions falling within the range of about 5% to 55% As, about 10% to 75% S, about 5% to 80% Se, and the balance by weight consisting essentially of Te in an amount ranging from about 4% to 45%, the amount of Te not exceeding the amount at which devitrification of the glass occurs on slow cooling. I have found that in order to insure a stable fused, vitreous glass composition substantially free from crystalline phases at high Te contents, the sum of S and Se in the composition should be at least about 20% for a Te content of at least about 35% by weight and for an arsenic content of at least about 10% by weight. I prefer, however, that the sulfur content be at least about 15% by weight and the selenium content at least about 10%.

I have found that by working within the aforementioned ranges, I am assured of compositions that can be safely reworked at elevated temperatures without having to resort to special techniques. such as rapid chilling from the soft or mobile state in order to prevent devitrification of the glass.

As a preferred composition, the glass-forming proportions of the elements may fall within the range of about 10% to 40% As, about 15% to 70% S, about 10% to 70% Se and about 10% to 40% Te.

Figure 2:
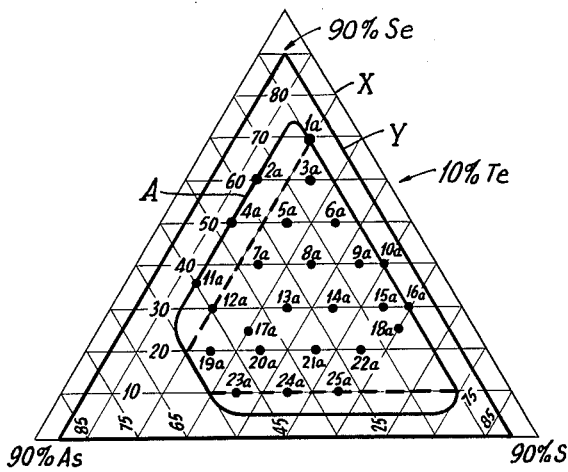

Examples of glass compositions falling within the above stated broad range are indicated in FIGS. 2 to 5 which are sections of the four-element tetrahedron shown in FIG. 1. The purpose of FIG. 1 is to merely illustrate the manner in which the sections were taken and does not indicate or show the composition ranges of the elements, these being more clearly indicated on FIGS. 2 to 5 at constant Te contents of approximately 10%, 20%, 30% and 40% Te, respectively. Referring first to FIG. 2, the outer triangular X is indicative of the triaxial coordinates making up one of the faces of the tetrahedron, with the corners thereof corresponding to 100% of the elements As, Se and S, while the heavy lined inner triangle Y is indicative of the section taken from FIG. 1 in which the corners show the same three elements at 90% maximum composition. Compositions falling within the invention are those encompassed by the area enclosed by continuous line A.

It will be apparent from the enclosed area that for a Te content of approximately 10%, the sulfur content may range from about 10% to about 75%, arsenic from about 5% to 55% and selenium from about 5% to 75%. As shown by the dotted lines in FIG. 2, the sulfur content may preferably be at least about 15% and the Se content at least about 10%. Examples of compositions encompassed by the enclosed area and containing approximately 10% Te are given in the following table:

Table 1

| Designation | Percent As | Percent S | Percent Se | Percent Te |
| --- | --- | --- | --- | --- |
| 1a | 5 | 15 | 70 | 10 |
| 2a | 20 | 10 | 60 | 10 |
| 3a | 10 | 20 | 60 | 10 |
| 4a | 30 | 10 | 50 | 10 |
| 5a | 20 | 20 | 50 | 10 |
| 6a | 10 | 30 | 50 | 10 |
| 7a | 30 | 20 | 40 | 10 |
| 8a | 20 | 30 | 40 | 10 |
| 9a | 10 | 40 | 40 | 10 |
| 10a | 5 | 45 | 40 | 10 |
| 11a | 45 | 10 | 35 | 10 |
| 12a | 45 | 15 | 30 | 10 |
| 13a | 30 | 30 | 30 | 10 |
| 14a | 20 | 40 | 30 | 10 |
| 15a | 10 | 50 | 30 | 10 |
| 16a | 5 | 55 | 30 | 10 |
| 17a | 40 | 25 | 25 | 10 |
| 18a | 10 | 55 | 25 | 10 |
| 19a | 50 | 20 | 20 | 10 |
| 20a | 40 | 30 | 20 | 10 |
| 21a | 30 | 40 | 20 | 10 |
| 22a | 20 | 50 | 20 | 10 |
| 23a | 50 | 30 | 10 | 10 |
| 24a | 40 | 40 | 10 | 10 |
| 25a | 30 | 50 | 10 | 10 |

Figure 3:
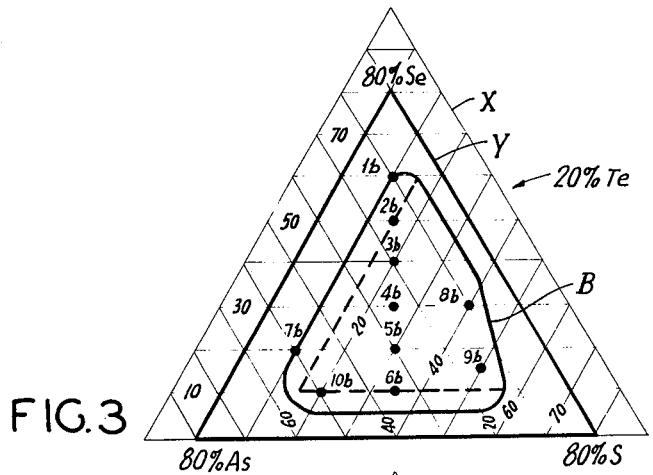

FIG. 3 is similar to FIG. 2 but differs in that the section is taken at a Te content of approximately 20%. Triangle Y which is shown inside triangle X is a section taken from FIG. 1. Compositions falling within the invention are those encompassed by the area enclosed by continuous line B. It will be apparent from the enclosed area that for a Te content of approximately 20%, the sulfur content may range from about 10% to between 65% and 70%, arsenic from about 5% to 55% and selenium from about 5% to about 60%. As also shown by the dotted lines in FIG. 2, the sulfur content may preferably be at least about 15%, and the Se content at least about 10%. Examples of compositions encompassed by the enclosed area and containing approximately 20% Te are given in the following table:

Table 2

| Designation | Percent As | Percent S | Percent Se | Percent Te |
| --- | --- | --- | --- | --- |
| 1b | 10 | 10 | 60 | 20 |
| 2b | 15 | 15 | 50 | 20 |
| 3b | 20 | 20 | 40 | 20 |
| 4b | 25 | 25 | 30 | 20 |
| 5b | 30 | 30 | 20 | 20 |
| 6b | 35 | 35 | 10 | 20 |
| 7b | 50 | 10 | 20 | 20 |
| 8b | 10 | 40 | 30 | 20 |
| 9b | 15 | 50 | 15 | 20 |
| 10b | 50 | 20 | 10 | 20 |

Figure 4:
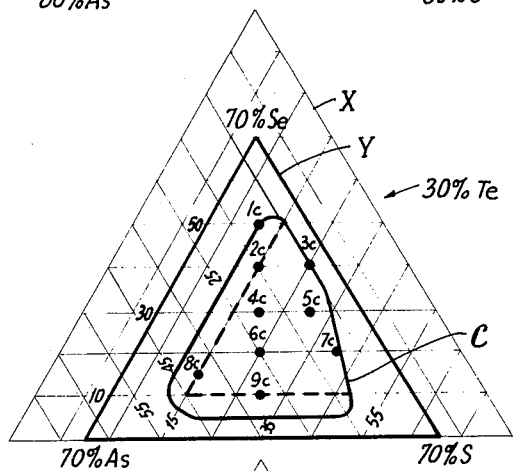
Figure 5:
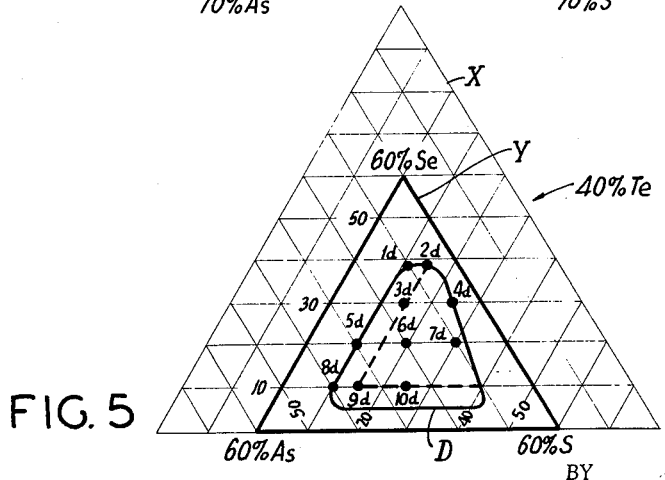

FIGS. 4 and 5 need not be discussed in detail since they are similar to FIGS. 2 and 3 (including the preferred minima (dotted lines) for S and Se of 15% and 10%, respectively) except that FIG. 4 is based on a Te content of approximately 30% and FIG. 5 on a constant Te content of approximately 40%. Examples of compositions encompassed by continuous solid line C of FIG. 4 are given as follows:

Table 3

| Designation | Percent As | Percent S | Percent Se | Percent Te |
|---|---|---|---|---|
| 1c | 10 | 10 | 50 | 30 |
| 2c | 15 | 15 | 40 | 30 |
| 3c | 5 | 25 | 40 | 30 |
| 4c | 20 | 20 | 30 | 30 |
| 5c | 10 | 30 | 30 | 30 |
| 6c | 25 | 25 | 20 | 30 |
| 7c | 10 | 40 | 20 | 30 |
| 8c | 40 | 15 | 15 | 30 |
| 9c | 30 | 30 | 10 | 30 |

Examples of compositions encompassed by continuous solid line D of FIG. 5 are likewise given as follows:

Table 4

| Designation | Percent As | Percent S | Percent Se | Percent Te |
|---|---|---|---|---|
| 1d | 10 | 10 | 40 | 40 |
| 2d | 5 | 15 | 40 | 40 |
| 3d | 15 | 15 | 30 | 40 |
| 4d | 5 | 25 | 30 | 40 |
| 5d | 30 | 10 | 20 | 40 |
| 6d | 20 | 20 | 20 | 40 |
| 7d | 10 | 30 | 20 | 40 |
| 8d | 40 | 10 | 10 | 40 |
| 9d | 35 | 15 | 10 | 40 |
| 10d | 25 | 25 | 10 | 40 |

It will be noted from FIGS. 2 to 5 that as the Te content increases from approximately 10% to approximately 40%, the areas encompassing the substantially stable glass-forming compositions of the invention decrease in size, thus showing the tendency of high amounts of Te in restricting the stable glass-forming composition ranges. As stated above, it is important when the Te content is at least about 35% and As at least about 10% that the sum of the sulfur and selenium contents in the composition be at least about 20% to insure stable glass-forming compositions.

Compositions having less than the indicated amount of S and Se generally cannot be fine annealed without a certain amount of crystallization taking place.

Tests conducted on compositions provided by the invention indicate a broad range of optical properties. With regard to refractive indices, first-order measurements indicate a broad range of refractive indices ranging from about 2.3 for a high-sulfur composition containing about 10% Te (No. 18a—10% As, 55% S, 25% Se and 10% Te) to an index as high as about 3.5 for a composition containing about 40% Te (No. 5d—30% As, 10% S, 20% Se and 40% Te).

Good quality optical fibers have been drawn from the new compositions ranging in size from about 0.001 to 0.02 inch having good transmission properties in the wavelength range of about 2 to 15 microns.

Transmission characteristics of new glasses were found to be superior to the glasses illustrated in the aforementioned U.S. Patent 2,883,291. In this patent, two of the better glasses referred to as compositions "M" and "N" were compared to several of the compositions provided by the invention. Two additional glasses "O" and "P" not mentioned in the patent but falling within the patented range were also compared as follows to glass Nos. 8a, 3b, 4c and 6d:

| Designation | Percent As | Percent S | Percent Se | Percent Te |
|---|---|---|---|---|
| M | 31.5 | 0.5 | 10.0 | 58.0 |
| N | 31.1 | 0.3 | 12.0 | 56.6 |
| O | 46.1 | 3.7 | 43.0 | 7.2 |
| P | 38.0 | 1.9 | 18.3 | 28.8 |
| 8a | 20 | 30 | 40 | 10 |
| 3b | 20 | 20 | 40 | 20 |
| 4c | 20 | 20 | 30 | 30 |
| 6d | 20 | 20 | 20 | 40 |

Glasses within the invention, that is Nos. 8a, 3b, 4c, 6d, exhibited somewhat superior transmission properties in that they sustained rather high percent transmission amounting to about 70% of the incident rays for wavelengths starting at 2 microns and ranging up to about 8 microns and thereafter about 60% from about 9 to about 12 and even 13 microns. In contradistinction, Nos. "M," "N," "O" and "P" exhibited lower transmission properties between 2 and 4 microns (not exceeding about 40% transmission) and between 4 and 12 microns not exceeding at best 60%. Composition "M" reached a maximum of about 50% between 5 and 12 microns while "O" did not exceed 45% transmission over the same range and "P" never reached more than 40%. It is apparent that quaternary compositions of the invention containing from about 10% to 40% tellurium and over 15% sulfur as illustrated hereinabove distinguish patentably over the compositions covered by the patent.

In producing the composition provided by the invention a relatively simple procedure may be employed as follows:

A glass composition corresponding to about 20% As, 20% S, 40% Se and 20% Te (designated as composition 3b in the table above) is prepared by weighing out a total of 500 grams of the elements of substantially high purity in the comminuted or granulated form. The elements are proportioned in accordance with the composition desired and are mixed and placed in a "Pyrex" glass container (about 2 inches in diameter) provided with a "Pyrex" glass cover adapted to enable a stirring rod to pass through the cover into the container and to enable the introduction of an inert atmosphere of nitrogen, argon, or the like.

The container is placed in a resistance-wound vertical furnace and heated so that the temperature is raised to 250° C. as fast as possible and held there so as to melt the sulfur and selenium. At this point, the mass is stirred in order to maintain a uniform mixture between the liquid phase and the solid arsenic and tellurium and to facilitate a smooth reaction. Upon completion of stirring, the mass is further heated at a maximum rate to 500° C. and the mixture which is completely molten stirred again, the stirring being continued for about an hour at this temperature.

The molten bath is then cooled down to about 400° C. at a rate of about 8 to 10° C. per hour while stirring at a continually decreasing rate to prevent striae, and the stirrer is then removed. The melt is then cooled to about 300° C. over a twenty-four hour period, this rate of cooling being important to prevent the formation of striae. At the end of this period, the composition is cooled from 300° C. to 200° C. in four hours.

After the temperature has reached 200° C., the composition is subjected to an annealing step comprising cooling it slowly to about 150° C. over a twenty-four hour period. The power to the furnace is turned off, and the composition is finally furnace-cooled to room temperature.

The glass product obtained from the "Pyrex" glass container is about 4 inches long and 2 inches in diameter. In subjecting the glass to a transmission test, a disc of about one quarter inch thick is first obtained from near the center of the cylindrical product by cutting with a diamond wheel. The slice is ground to a thickness of about 2 mm. and polished in an essentially conventional manner.

The resulting test sample is then mounted in a sample holder and put into the sample beam of a Baird double-beam recording infrared spectrophotometer (manufactured by the Baird Atomic Co. of Cambridge, Mass.). The instrument is operated to record the transmission characteristics of infrared radiation ranging from 2 to 16 microns in wavelength. The results showed that this glass (No. 3b) indicated a rather high cut-off at a wavelength of over 13.5 microns and a high transmission of about 70% between 2 and 9 microns and sustained a transmission of over 60% up to 12 microns.

As stated hereinbefore, my novel compositions are applicable to the field of fiber optics and to the production of light-transmitting glass rods or infrared light pipes capable of transmitting light or other forms of radiant energy by total internal reflection from one end of the rod to the other. The light pipe may be used with a glass coating to insure a substantially high degree of internal reflection, the glass coating being an infrared transmitting glass having an index of refraction lower than that of the core pipe.

Likewise, optical fibers may be coated with an infrared transmitting glass. The optical fibers may range in diameter up to as high as 0.01 or 0.015 inch, and, preferably, up to 100 microns. The fiber may be produced by the conventional means used for producing fibers from glass compositions. One method of producing an optical fiber having a glass coating of an infrared transmitting glass is to take a rod of my novel composition to be used as the fiber itself and insert it as the core into a tube of an infrared transmitting glass having a refractive index lower than the core material and substantially equivalent transmission characteristics. A close fit between the rod or core and the tube is essential. The assembly is fed to a concentrated heat source in an inert atmosphere to effect incremental fusion of the coated core and, in accordance with conventional practice, the glass rod assembly is then drawn into a fiber of desired diameter. The glass coating has an additional advantage of enhancing the strength and abrasion resistance of the fiber by paying careful attention to the comparative thermal expansion characteristics of the core glass and the coating glass.

It is apparent from the disclosure that quaternary compositions within the invention provide improved glasses characterized by a wide and broad range of optical properties. Such properties are obtained by producing glasses within broadly stated compositions and preferably within the areas delineated by continuous solid lines A, B, C and D of FIGS. 2 to 5. As shown by FIGS. 2 to 5, the preferred compositions may range from about 10 to about 40% tellurium, with substantially the balance arsenic, sulfur and selenium as determined by the boundary conditions in said figures and by interpolation between said figures over the aforementioned preferred telurium range.

While the invention is concerned substantially with the quaternary compositions disclosed and claimed herein, it will be appreciated that small amounts of other ingredients may be tolerated in the quaternary composition without adversely effecting substantially the transmission and other optical properties of the glass provided by the invention.

It will be seen that I have described improved glass compositions and have delineated a new field of glasses. My glasses have good infrared-transmitting properties and provide a broad range of optical characteristics.

While I have described the invention in detail with particular reference to certain glasses, it will be understood that the invention is of broader scope and is defined in the claims which follow.

What is claimed is:

1. An optical, infrared-transmitting glass composition formed of a fused, vitreous, non-crystalline substantially quaternary glass-forming mixture capable of being reworked at an elevated softening temperature without devitrifying, said mixture consisting of arsenic, sulfur, selenium and tellurium in percentages by weight ranging from about 5% to 55% arsenic, about 10% to 75% sulfur, about 5% to 80% selenium, and the balance by weight constituting tellurium in an amount ranging from 4% to 45%, wherein said amount of tellurium does not exceed the amount at which devitrification of the glass occurs and wherein for a tellurium content of at least about 35% by weight the sum of the sulfur and selenium contents is at least about 20% by weight and the arsenic content is at least about 10% by weight.

2. The glass composition of claim 1 wherein the sulfur content is at least about 15% and the selenium content at least about 10% by weight of total composition.

3. An optical, infra-red-transmitting glass composition formed of a fused, vitreous, non-crystalline substantially quaternary mixture capable of being reworked at an elesated softening temperature without devitrifying, said mixture consisting of arsenic, selenium, sulfur and tellurium in percentages by weight ranging from about 10% to 40% arsenic, about 15% to 70% sulfur, about 10% to 70% selenium, and the balance by weight consisting of tellurium in an amount ranging from about 10% to 40%, wherein said amount of tellurium does not exceed the amount at which devitrification of the glass occurs.

4. An optical, infrared-transmitting glass capable of being overworked at an elevated softening temperature without devitrifying, said glass consisting of about 10% to about 40% tellurium, with substantially the balance consisting of arsenic, sulfur and selenium as determined by the boundary condition set forth in FIGS. 2 to 5 and as determined by the interpolation between the boundaries of said figures over the aforementioned tellurium range.

5. An optical, infrared-transmitting glass composition capable of being reworked at an elevated softening temperature without devitrifying, said composition consisting of about 10% tellurium and substantially the balance consisting of arsenic, sulfur and selenium in the amounts determined by the area enclosed substantially within continuous solid line A depicted in the triaxial diagram of FIG. 2.

6. An optical, infrared-transmitting glass composition capable of being reworked at an elevated softening temperature without devitrifying, said composition consisting of about 20% tellurium and substantially the balance consisting of arsenic, sulfur and selenium in the amounts determined by the area enclosed substantially within continuous solid line B depicted in the triaxial diagram of FIG. 3.

7. An optical, infrared-transmitting glass composition capable of being reworked at an elevated softening temterature without devitrifying, said composition consisting of about 30% tellurium and substantially the balance consisting of sulfur and selenium in the amounts determined by the area enclosed substantially within continuout solid line C depicted in the triaxial diagram of FIG. 4.

8. An optical, infrared-transmitting glass composition capable of being reworked at an elevated softening temperature without devitrifying, said composition consisting of about 40% tellurium and substantially the balance consisting of arsenic, sulfur and selenium in the amounts determined by the area enclosed substantially within continuous solid line D depicted in the triaxial diagram of FIG. 5.

9. An optical, infrared-transmitting lens formed of a fused, vitreous, non-crystalline substantially quaternary glass-forming mixture capable of being reworked at an elevated softening temperature without devitrifying, said mixture consisting of arsenic, sulfur, selenium and tellurium in percentages by weight ranging from about 5% to 55% arsenic, about 10% to 75% sulfur, about 5% to 80% selenium, and the balance by weight consisting of tellurium in an amount ranging from about 4% to 45%, wherein said amount of tellurium does not exceed the amount at which devitrification of the glass occurs and wherein for a tellurium content of at least about 35% by weight the sum of the sulfur and selenium contents is at least about 20% by weight and the arsenic content is at least about 10% by weight.

10. An infrared-transmitting light pipe formed of a rod of a fused, vitreous, non-crystalline substantially quaternary glass-forming mixture capable of being reworked at an elevated softening temperature without devitrifying, said mixture consisting of arsenic, sulfur, selenium and tellurium in percentages by weight ranging from about 5% to 55% arsenic, about 10% to 75% sulfur, about 5% to 80% selenium, and the balance by weight consisting of tellurium in an amount ranging from about 4% to 45%, wherein said amount of telurium does not exceed the amount at which devitrification of the glass occurs and wherein for a tellurium content of at least about 35% by weight the sum of the sulfur and selenium contents is at least about 20% by weight and the arsenic content is at least about 10% by weight.

11. An infra-red transmitting optical fiber formed of a fused, vitreous, non-crystalline substantially quaternary glass-forming mixture capable of being reworked at an elevated softening temperature without devitrifying, said mixture consisting of arsenic, sulfur, selenium and tellurium in percentages by weight ranging from about 5% to 55% arsenic, about 10% to 75% sulfur, about 5% to 80% selenium, and the balance by weight consisting of tellurium in an amount ranging from about 4% to 45%, wherein said amount of tellurium does not exceed the amount at which devitrification of the glass occurs and wherein for a tellurium content of at least about 35% by weight the sum of the sulfur and selenium contents is at least about 20% by weight and the arsenic content is at least about 10% by weight.

References Cited by the Examiner

UNITED STATES PATENTS

| | | | |
|---|---|---|---|
| 2,883,291 | 4/1959 | Fraser | 106—47.0 |
| 2,883,292 | 4/1959 | Jerger | 106—47.0 |
| 2,883,293 | 4/1959 | Jerger et al. | 106—47.0 |
| 2,883,294 | 4/1959 | Jerger | 106—47.0 |
| 2,883,295 | 4/1959 | Jerger | 106—47.0 |
| 3,033,693 | 5/1962 | Carnall et al. | 106—47 |

TOBIAS E. LEVOW, *Primary Examiner.*

JOHN R. SPECK, *Examiner.*